United States Patent [19]

Foster

[11] Patent Number: 5,096,356
[45] Date of Patent: Mar. 17, 1992

[54] RECIPROCATING FLOOR CONVEYOR IN A RECEPTACLE FOR A LIQUID LADEN MATERIAL

[76] Inventor: Raymond K. Foster, P.O. Box 1, Madras, Oreg. 97741

[21] Appl. No.: 682,594

[22] Filed: Apr. 8, 1991

[51] Int. Cl.⁵ .................................................. B65G 65/08
[52] U.S. Cl. .................................. 414/325; 414/525.1; 198/750
[58] Field of Search ...................... 198/750; 414/525.1, 414/325

[56] References Cited

U.S. PATENT DOCUMENTS

| | | | |
|---|---|---|---|
| 4,363,586 | 12/1982 | Gessler et al. | 414/325 |
| 4,571,150 | 2/1986 | Foster | 414/325 X |
| 4,594,045 | 6/1986 | Hooper et al. | 414/325 |
| 4,611,708 | 9/1986 | Foster | 198/750 |
| 4,727,978 | 3/1988 | Hallstrom, Jr. | 198/750 X |
| 4,798,802 | 1/1989 | Ryan | 198/750 X |

*Primary Examiner*—D. Glenn Dayoan
*Attorney, Agent, or Firm*—Delbert J. Barnard

[57] ABSTRACT

Three piston-cylinders units (66, 68, 70) are located in a drive assembly compartment (26) forwardly of a material receiving compartment (12) in a trailer box (TB). Drive rods (262, 264, 266) extend rearwardly from transverse drive beam portions (60, 62, 64) of the drive units (66, 68, 70) through bushings (B) carried by a vertical portion (32) of a bulkhead (24) between the two compartments (26, 12). The rear ends of the drive rods (262, 264, 266) are connected to forward ends of floor members (30) within the material compartment (12).

11 Claims, 7 Drawing Sheets

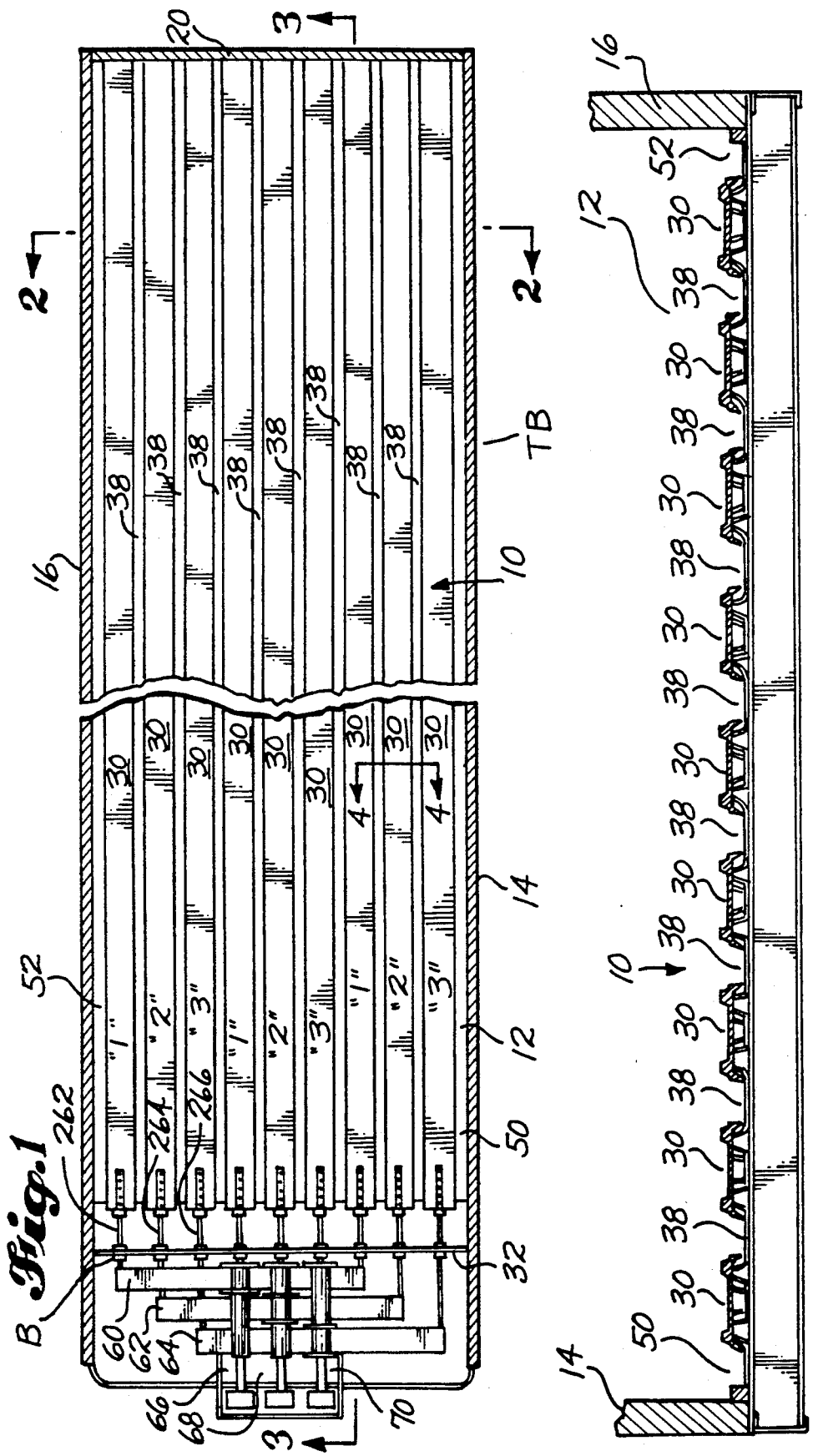

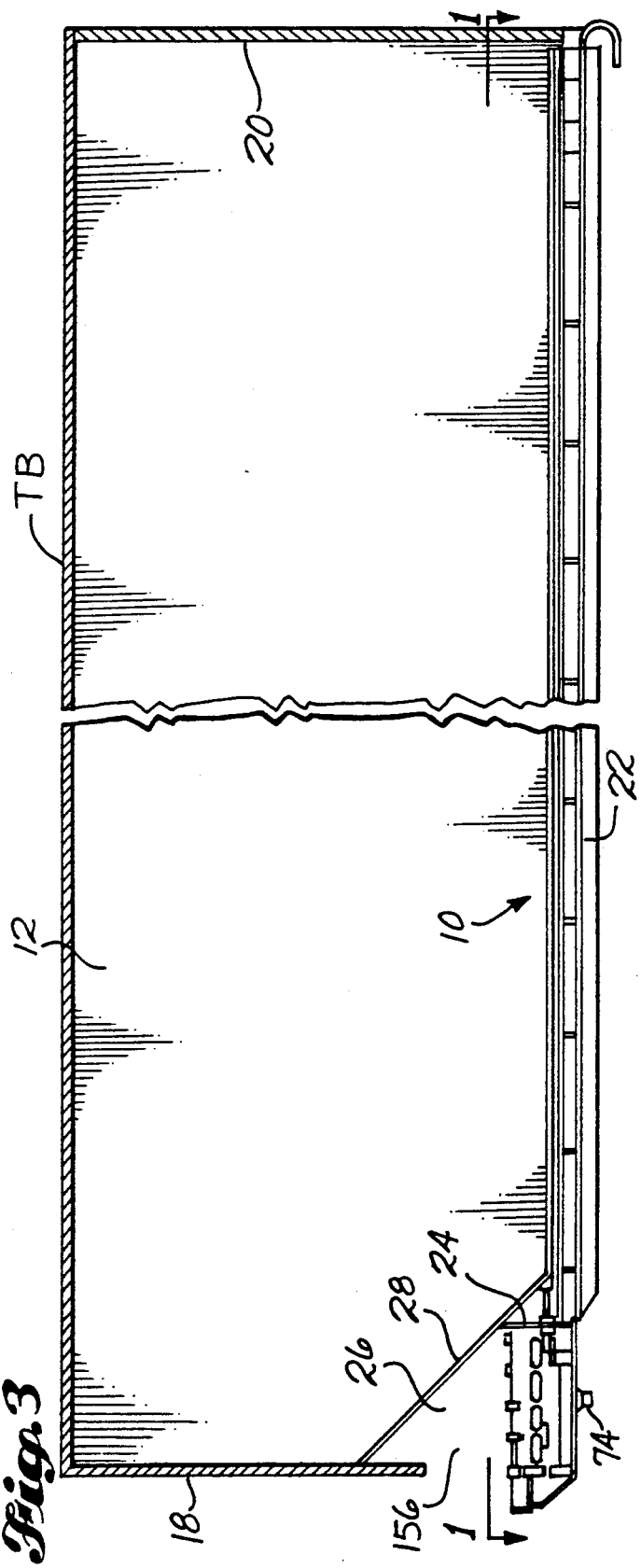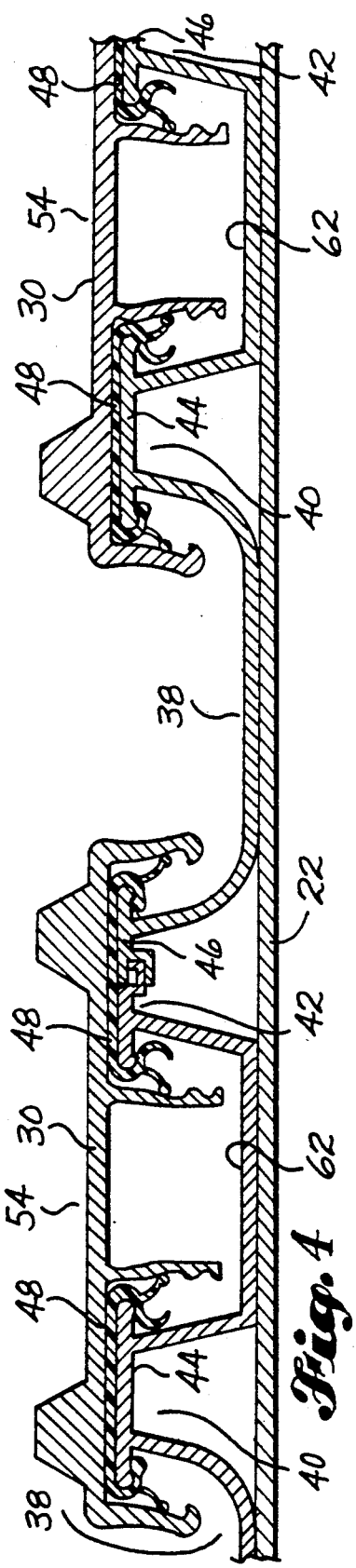

RECIPROCATING FLOOR CONVEYOR IN A RECEPTACLE FOR A LIQUID LADEN MATERIAL

TECHNICAL FIELD

This invention relates to the handling of a liquid laden material such as garbage. More particularly, it relates to the provision of a receptacle for the material which includes a leakproof reciprocating floor conveyor, and the construction of a drive mechanism for the floor members of the conveyor.

BACKGROUND INFORMATION

It is known to deposit garbage into containers which when full of garbage are transmitted to a landfill or other receiving site for the garbage. It is also known to provide such containers with reciprocating floor containers which are used to remove the garbage from the containers. My U.S. Pat. No. 4,785,929, granted Nov. 22, 1980, discloses floor members and a support bearing system for a reciprocating floor conveyor which has been used in garbage haul containers. My U.S. Pat. No. 4,611,708, granted Sept. 16, 1989, discloses the floor members and a support bearing system for another type of reciprocating floor conveyor that has been used in garbage haul containers. Herein the term "container" is used to mean a truck box, a trailer box, a transport container and fixed installation containers. These containers all include a bottom, two sidewalls and two end walls, one of which is openable. Some also include a top. The bottom is formed by or includes a reciprocating floor conveyor.

The principal object of the present invention is to provide a container for liquid bearing material which includes a waterproof bottom extending throughout the container, and a drive mechanism for the floor members of the conveyor which is housed within a lower forward portion of the container, rather than below the bottom of the container.

DISCLOSURE OF THE INVENTION

According to an aspect of the invention, a reciprocating floor conveyor is provided within an elongated material receiving compartment. The conveyor comprises a plurality of elongated load-supporting floor members supported for longitudinal back and forth movement within the material receiving compartment. A drive assembly compartment is provided at one end of the material receiving compartment. A bulkhead is positioned between the material receiving compartment and the drive assembly compartment. A plurality of piston-cylinder drive units are positioned within the drive assembly compartment. Each drive unit is associated with a separate set of the floor members. The drive units are operated to move the floor members longitudinally. Each drive unit includes longitudinally extending drive rods, one for each of its floor members. The drive rods extend from the drive units through the bulkhead, into the material receiving compartment and are connected to the floor members within the material receiving compartment.

In preferred form, the floor of the material receiving compartment is substantially leakproof. The bulkhead is provided with a plurality of bushings, one for each drive rod. The drive rods extend through the bushings. The bushings include seals for sealing against liquid leakage from the material receiving compartment, through the bushings, into the drive assembly compartment.

In preferred form, each drive unit includes a stationary piston rod having first and second ends, a piston head on the piston rod, at a location between its ends, and a cylinder barrel mounted on the piston head and piston rod for back and forth movement longitudinally of the piston head and piston rod. The cylinder barrel includes a cylinder head at each of its ends having a central opening in which a portion of the piston rod is received. A transverse drive beam is secured to each cylinder barrel, within the drive assembly compartment. The drive rods for each drive unit are connected to the transverse drive beam of the drive unit.

The material receiving compartment may have a seal door at its end opposite the drive assembly compartment, for holding liquid within the material compartment. Or, a collection trough may be provided for collecting liquid which drains from material that is in the material receiving compartment. Liquid that is collected by the trough may be delivered by the trough into a liquid receiving receptacle. Or, liquid which drains from the material may be picked up at the bottom of the receptacle and pumped back up to the top of the receptacle, back into the material.

Other objects, features, and advantages of the invention are hereinafter described in detail as a part of the description of the best mode.

BRIEF DESCRIPTION OF THE DRAWINGS

Like reference numerals and letters are used to designate like parts throughout the several views of the drawing, and:

FIG. 1 is a longitudinal sectional view taken through a trailer box, substantially along line 1—1 of FIG. 3, such view including a top plan view of a reciprocating floor conveyor within the trailer box;

FIG. 2 is an enlarged scale cross-sectional view taken substantially along line 2—2 of FIG. 1;

FIG. 3 is a longitudinal sectional view on the same scale as FIG. 1, taken substantially along line 3—3 of FIG. 1;

FIG. 4 is an enlarged scale fragmentary sectional view taken substantially along line 4—4 of FIG. 1;

FIG. 6 is an enlarged scale view of the forward portion of FIG. 3;

FIG. 7 is a fragmentary, enlarged scale longitudinal sectional view of a drive rod bushing, such view showing the drive rod in side elevation;

FIG. 8 is a schematic diagram of a preferred embodiment of a drive mechanism for the floor members;

FIG. 9 is an enlarged scale fragmentary sectional view at the forward end of a piston-cylinder unit;

BEST MODE FOR CARRYING OUT THE INVENTION

Figure 5:
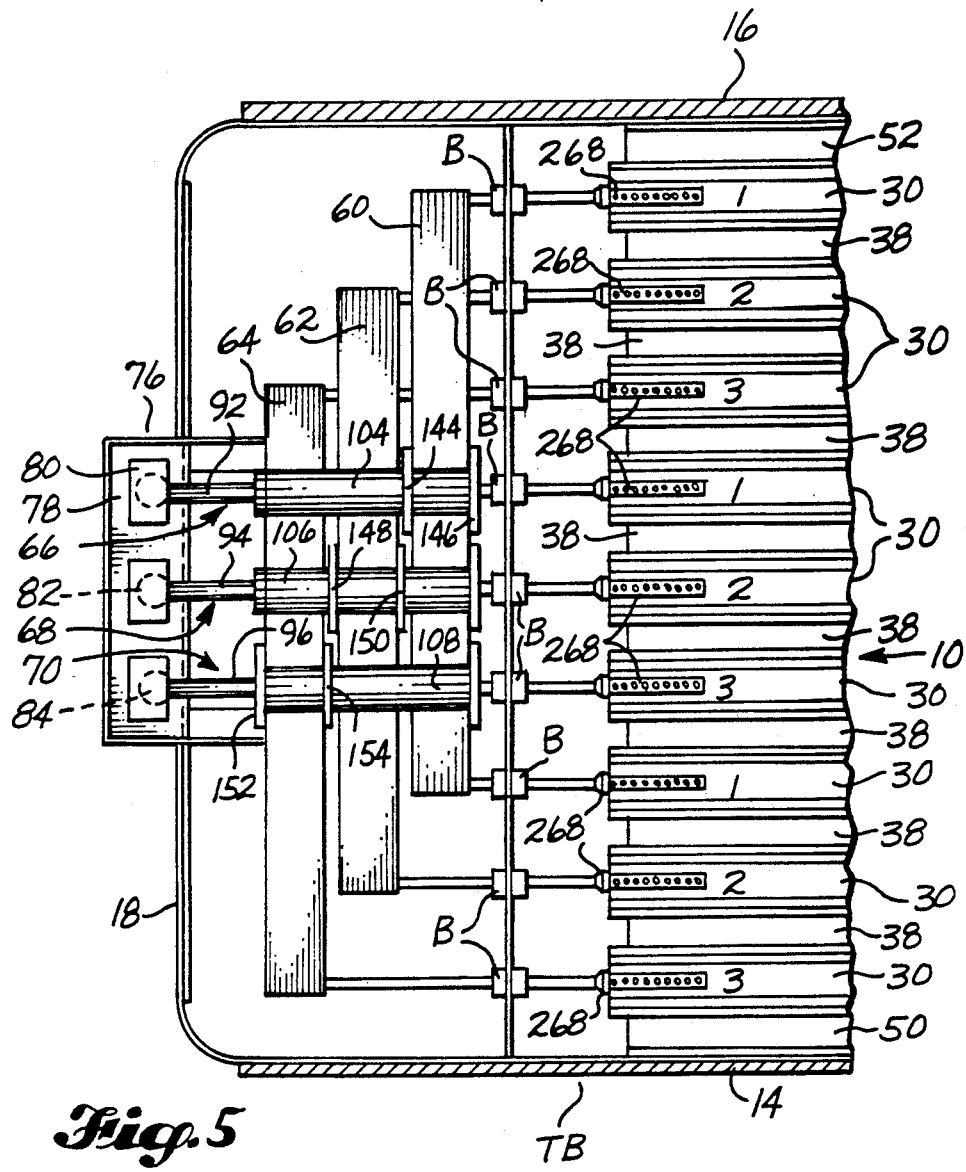
FIG. 5 is an enlarged scale view of the forward portion of FIG. 1.
Figure 10:
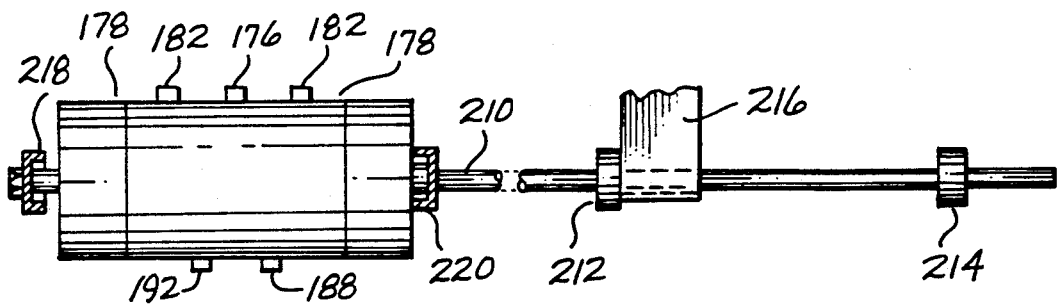
FIG. 10 is an enlarged scale fragmentary sectional view of a switching valve assembly and its control rod, showing the control rod in a first end position.
Figure 11:
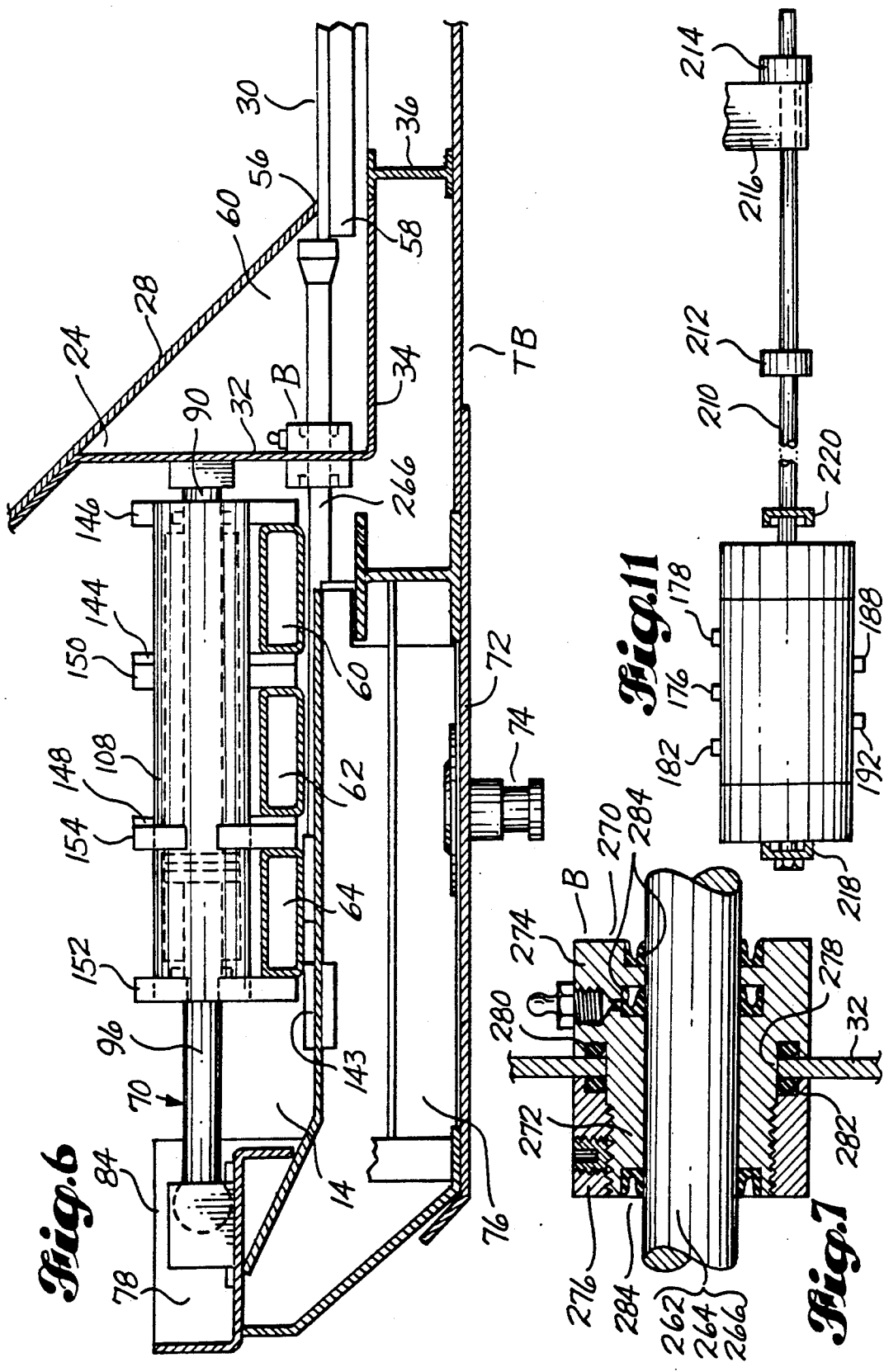
FIG. 11 is a view like FIG. 10, but showing the control rod in a second end position.

Referring to FIGS. 1 and 3, a reciprocating floor conveyor 10 is shown installed within a material receiving compartment 12 of a trailer box TB. Trailer box TB has sidewalls 14, 16, a forward wall 18, a rear wall 20 and a floor or bottom 22. Rear wall 20 may be a door or a pair of doors. A bulkhead 24 helps to define a drive assembly compartment 26 at the forward end of the material receiving compartment 12. A sloping wall 28 extends rearwardly and downwardly from forward wall 18 to floor members 30 of the reciprocating floor conveyor 10. Bulkhead 24 has a vertical portion 32 and a horizontal portion 34. The vertical portion 32 extends downwardly from wall 28 and makes a right angle intersection with horizontal portion 34. Horizontal portion 34 extends rearwardly to a transverse support beam 36. Wall 28 and bulkhead portions 32, 34 extend the full width of the material receiving compartment. The forward upper end of wall 28 is connected to wall 18. The opposite ends of wall 28 and bulkhead portions 32, 34 are connected to sidewalls 14, 16. The upper end of bulkhead portion 32 is connected to wall 28. The rearward end of wall 34 is connected to beam 36. These connections are all substantially waterproof connections. This is so that a liquid containing material, such as garbage, can be put into the material receiving compartment 12, and the liquid will not leak from the material into the drive assembly compartment 26.

Preferably, reciprocating floor conveyor 10 is composed of a plurality of floor members 30 separated by liquid collecting channels 38. Preferably also, the floor members 30 are supported and guided by a base structure constructed from longitudinal sections which are connected together at their edges to provide a substantially leakproof barrier below the floor members 30, and above the compartment bottom 22. Compartment bottom 22 may be an impervious diaphragm. Or, the compartment bottom may be made leakproof by the base structure alone. The base structure defines a plurality of longitudinal guide beams 40, 42 for supporting and guiding the floor members 30. Each floor member 30 sets on an adjacent pair of guide beams 40, 42. Each guide beam 40, 42 includes a top portion 44, 46 onto which slide bearings 48 are secured. The slide bearings 48 snap down onto the guide beams 40, 42. The floor members 30 snap down onto the bearings 48. The construction of the floor members, the base structure and the bearings forms the subject matter of my copending application Ser. No. 07/682,463, filed Apr. 8, 1991 and entitled Reciprocating Floor Conveyor with Liquid Collecting Channels Between the Floor Members.

The channels 38 between floor members 30, the side channels 50, 52, and the shallow channels 54 formed on the tops of the floor members 30, may all drain into a transverse trough which collects liquid and directs it to a collection receptacle. This type of system is disclosed in my copending application Ser. No. 07/516,972, filed Apr. 30, 1990, and entitled Container For Liquid Bearing Material. As shown by FIG. 6, the lower rear edge 56 of wall 28 substantially contacts the floor members 30. Floor members 30 include forward end portions 58 which are located within space 60. Any liquid which flows into space 60 will flow rearwardly through the channels 38 and 62 to the collection system at the rear end of compartment 12.

As will be appreciated, the length and width of the conveyor 10 is dependent on the length and width of the trailer box TB. In the illustrated embodiment, the conveyor 10 comprises nine floor members 30. Floor members 30 are divided into three sets "1", "2" and "3", and into three groups. Each group includes a floor member "1", a floor member "2" and a floor member "3", in that order. The set of floor members "1" are connected to a transverse drive beam 60. The floor members "2" are connected to a second transverse drive beam 62. The floor members "3" are connected to a third transverse drive beam 64. Drive beam 60 is secured to a first piston-cylinder drive unit 66. Drive beam 62 is connected to a second piston-cylinder drive unit 68. Drive beam 64 is connected to a third piston-cylinder drive unit 70. The drive units 66, 68, 70 are parallel and extend longitudinally of the conveyor 10 and the trailer box TB. Drive beams 60, 62, 64 are parallel and they extend transversely of the conveyor 10 and the trailer box TB.

Referring to FIG. 6, trailer box TB includes a forward bottom plate 72 which carries a depending coupling pin 74 which is a part of a connection between the trailer and the truck which tows the trailer. This connection is commonly referred to as a "fifth wheel." The trailer box TB is quite strong in this region. A suitable support frame 76 for the drive units is provided in this region above the plate 72. The frame 76 is of a width shown by FIG. 5 and a length shown by FIG. 6. The forward end of the frame 76 includes a support pedestal 78 for the forward ends of the drive units 66, 68, 70.

As shown by FIGS. 5, 6 and 9, each drive unit 66, 68, 70 includes a first or forward end portion 80, 82, 84 which is connected to the pedestal 78 of frame 78 and a second or rear end portion 86, 88, 90 which is supported by the bulkhead 24. The opposite ends 80, 82, 84 and 86, 88, 90 of the piston-cylinder units 66, 68, 70 are the opposite ends of a stationary piston rod which extends continuously throughout the full length of the drive units 66, 68, 70. The piston rod of the drive unit 66 is designated 92. The piston rod of drive unit 68 is designated 94. The piston rod of drive unit 70 is designated 96. Each piston rod includes a fixed piston head secured to the rod intermediate its two ends. Piston head 98 is connected to piston rod 92. Piston head 100 is connected to piston rod 94. Piston head 102 is connected to piston rod 96. A cylinder barrel is mounted to travel on each piston rod. Cylinder barrel 104 is mounted to travel on piston rod 92. Cylinder barrel 106 is mounted to travel on piston rod 94. Cylinder barrel 108 is mounted to travel on piston rod 96. Each cylinder barrel 104, 106, 108 includes two cylinder heads, one at each of its ends. The forward cylinder heads are designated 110, 112, 114. The rearward cylinder heads are designated 116, 118, 120. The cylinder heads 110, 112, 114, 116, 118, 120 and the piston heads 98, 100, 102 serve to brace and stiffen the piston rods 92, 94, 96. The cylinder heads 110, 112, 114, 116, 118, 120 carry seal rings and wear rings where they surround the piston rods 92, 94, 96. The piston heads 98, 100, 102 carry seal rings and wear rings where they contact the inner surfaces of the cylinder barrels 104, 106, 108. As shown by FIG. 8, drive units 66, 68, 70 include forward working chambers 122, 124, 126, and rearward working chambers 128, 130, 132. The front and rear working chambers are separated by the piston heads 98, 100, 102.

The forward end portions 80, 82, 84 of the piston rods 92, 94, 96 preferably are in the form of a ball component of a ball and socket joint. FIG. 9 shows end portion 84 enlarged. End portion or ball 84 is housed within a housing 132 which is of sectional construction. When assembled about the ball end 84, housing 134 defines the socket in which the ball end 84 is received. The ball and socket connection allows a limited amount of movement of the ball end 84 with respect to the housing 134 and the frame parts 76, 78, in response to a slight deflection of the piston rod 96 during back and forth movement of cylinder barrel 108.

The rearward ends 86, 88, 90 of the piston rods 92, 94, 96 may be inserted into mounting cups 134, 136, 138 which are secured to vertical portion 32 of the bulkhead 24. The piston rods 92, 94, 96 are hollow. They may be closed at their rear ends 134, 136, 138 by internal plugs 140, 142, 144. The closed end portions 86, 88, 90 are then moved endwise into the cups 134, 136, 138. The housings in which the ball ends are received (e.g. housing 134 for ball end 84) are bolted to the pedestal portion 78 of frame 76. The ball housings (134) may be of two part construction, such as disclosed in my U.S. Pat. No. 4,817,783, granted Apr. 4, 1989, or in U.S. Pat. No. 3,202,062, granted Aug. 24, 1965, to Robert W Burden.

As shown by FIG. 6, a vertical space 141 exists between the piston rods 92, 94, 96 and the upper wall 143 of mounting frame 76. The three transverse drive beams 60, 62, 64 are located within this vertical space 141. Drive beam 60 is connected to cylinder barrel 104 by means of a pair of clamps 144, 146. Drive beam 62 is connected to cylinder barrel 106 by means of a pair of clamps 148, 150. Drive beam 64 is connected to cylinder barrel 108 by means of a pair of clamps 152, 154. This type of connection is per se old. The clamps may be of the type disclosed in my U.S. Pat. No. 4,793,469, granted Dec. 27, 1988. As shown by FIG. 5, the clamps are spaced apart longitudinally of the cylinder barrels a distance equal to the width of the drive beams. This spacing provides a strong connection between the drive beams and the cylinder barrels. Forces imposed on the drive beams are transmitted by the clamps to the cylinder barrels. The cylinder barrels in turn transmit the forces to the cylinder heads and the piston heads. The cylinder and piston heads transmit the forces to the stationary piston rods. The piston rods transmit the forces to the two end connections which in turn transmit them to the mounting frame and the bulkhead wall 24. The shape of bulkhead wall 24, and its connection to wall 28 and transverse frame beam 36, imposes sufficient rigidity in bulkhead wall 24 to enable it to receive and transmit forces from the piston rods 92, 94, 96.

As shown by FIGS. 1, 3 and 5, the forward end portion of drive assembly frame 76, including the pedestal 78, may project forwardly of the front wall 18 of material compartment 12. This is done to reduce the size of diagonal wall 28 and to position wall 28 more forwardly in compartment 12 than would be the case if the entire drive assembly were to be positioned rearwardly of wall 18. An access opening 156 may be formed in wall 18 immediately above the pedestal end 78 of frame 76 (FIG. 3). This opening 156 may be provided with a door (not shown) which is normally closed. According to the invention the drive assembly may in some installations be located forwardly of wall 18, with wall 18 functioning as a bulkhead.

Referring to FIG. 8, each piston rod includes a pair of fluid passageways which partially extend through the ball end of the rod. These passageways include an inner passageway and an outer passageway. The inner passageway for piston rod 92 is designated is 154. It is formed by a tube which extends lengthwise of the piston rod 92, between the ball end 80 and piston head 98. Tube 154 extends through piston rod 98 into working chamber 128, via one or more side ports 158. The second passageway 156 is an annular passageway formed by and between the piston rod 92 and the tube 154. It extends from ball end 80 to working chamber 122. A tube 160 located within piston rod 68 extends between ball end 82 and piston head 100. Fluid flowing through this tube is delivered past piston head 100 into working chamber 130, via one or more side ports 162. An annular passageway 164 is defined by and between piston rod 94 and tube 190. This passageway extends between ball end 82 and working chamber 124. Piston rod 96 includes a tube 166 which extends between ball end 84 and piston head 102. It delivers fluid through piston head 102 and into working chamber 132, via a port or ports 168. An annular fluid passageway 170 is formed by and between piston rod 96 and tube 166. This passageway extends between ball end 84 and working chamber 126. As shown by FIG. 8, side ports in the piston rods 92, 94, 96 communicate the annular chambers 156, 164, 170 with the working chambers 122, 124, 126. Thus, the passageways formed by the tubes 154, 160, 166, and the sidewall ports 158, 162, 168, deliver fluid into and out from the working chambers 128, 130, 132. The annular passageways 156, 164, 170, and sidewall ports, deliver hydraulic fluid to and from the working chambers 122, 124, 126.

As shown by FIG. 8, fluid pressure from a suitable source, such as a pump 172, is delivered through a delivery line 174 to an inlet port 176 of a valve housing 178. A return line 180 extends from a return port 182 in housing 178, back to a storage tank 184. A conduit 186 extends outwardly from a cylinder port 188 in housing 178. A second conduit 190 extends outwardly from a second cylinder port 192 in housing 178. Conduit 190 connects together, in parallel, the outer ends of annular passageways 156, 164, 170. Branch conduit 186 extends to an inlet port 188 connected to the outer end of tubular passageway 154 in piston rod 96. A sequencing valve 191 controls flow through an orifice which connects passageway 186 with a spring chamber 192 (FIG. 9) and a passageway 194 which extends outwardly from chamber 192. Passageway 194 extends to a port which connects with passageway 170. A second sequencing valve 196 controls flow through a port which communicates passageway 194 with a valve chamber 198 and a conduit 200. Conduit 200 connects to a port 202 which is connected to the outer end of tubular passageway 154.

Figure 12:
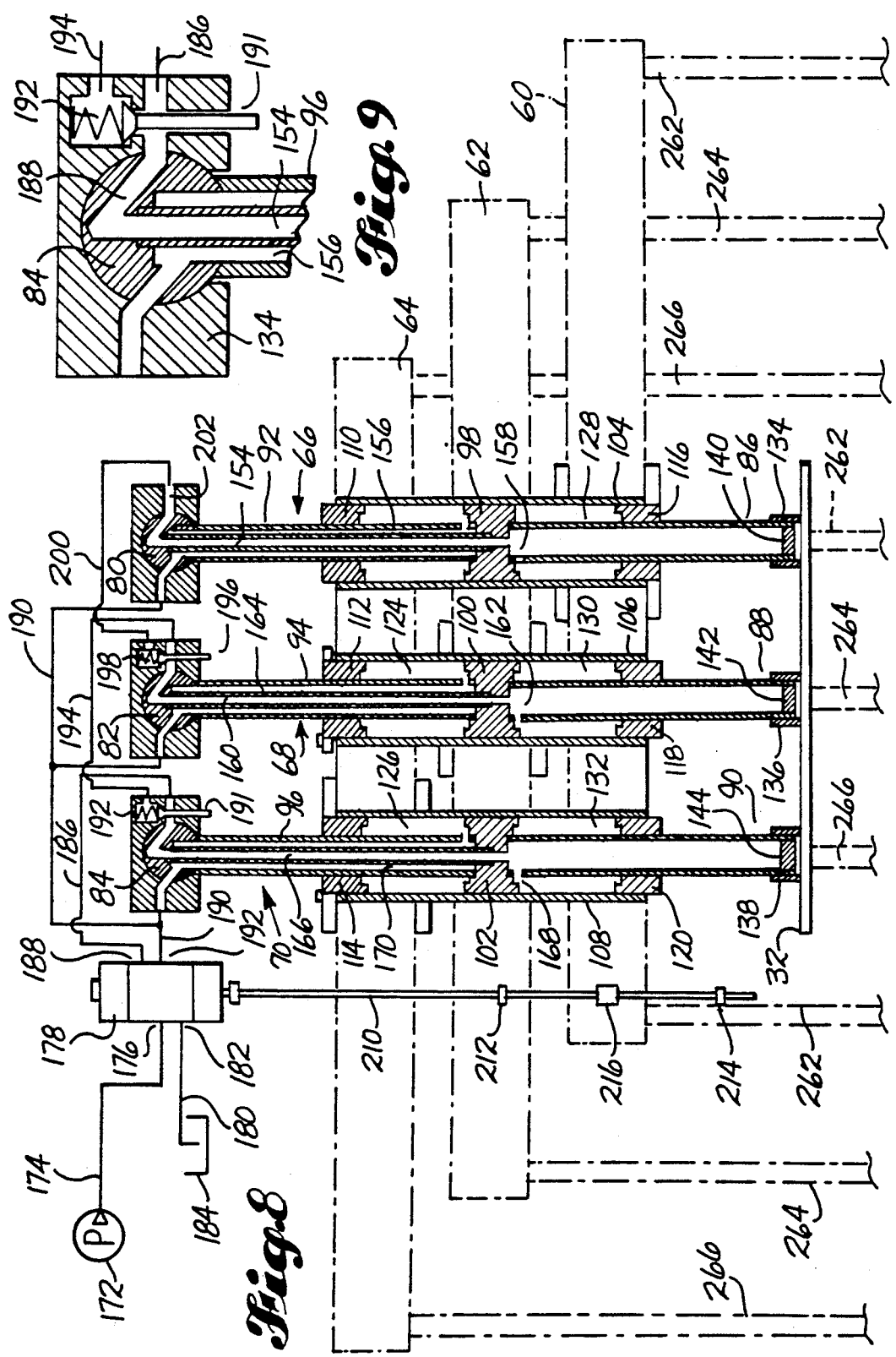
FIG. 12 is an enlarged scale longitudinal sectional view of the switching valve assembly, with the control rod in the position shown by FIG. 10.
Figure 13:
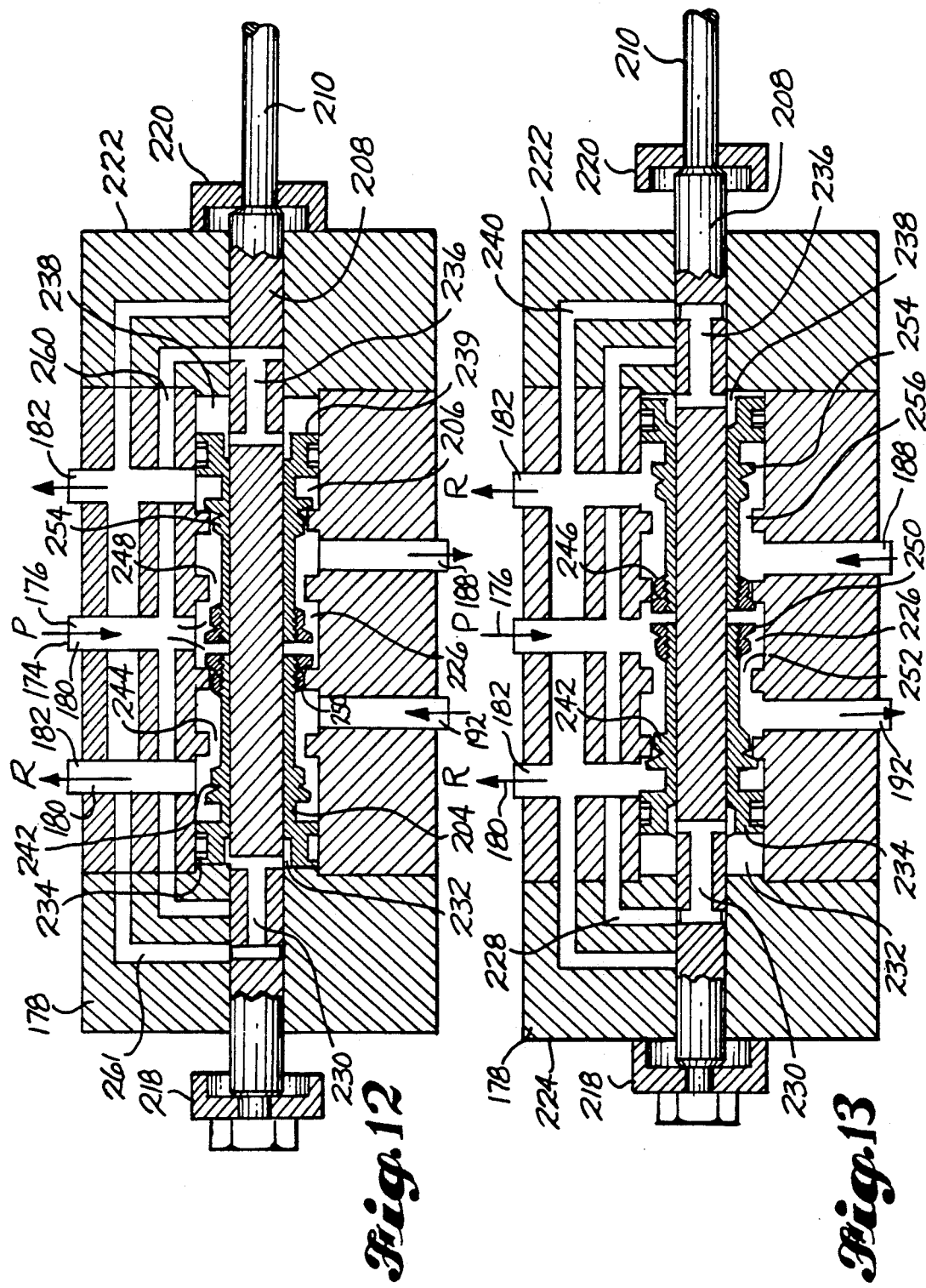
FIG. 13 is a view like FIG. 12, but showing the control rod in the position shown by FIG. 11.

Housing 178 houses a pair of poppet valves 204, 206 and a pilot valve member 208. Pilot valve member 208 is directly connected to a control rod 210. Control rod 210 extends endwise from housing 178, generally parallel with the piston rods 92, 94, 96. Control rod 210 includes a pair of spaced apart bumpers 212, 214 which are positioned on opposite sides of a control member 216 which is connected to drive beam 60. A rearward movement of drive beam 60 causes contact between control member 216 and bumper 210, causing in turn an endwise movement of pilot valve member 208, into the position shown by FIG. 13. A movement of drive beam 60 forwardly into its forward position causes contact between control member 216 and bumper 212. This contact moves the pilot valve member 208 endwise into the position shown by FIG. 2. As shown by FIGS. 12 and 13, stops 218, 220 are secured to the opposite ends of the pilot valve member 208. Contact between stop 220 and housing end surface 222 puts the pilot valve member 208 into the position shown by FIG. 12. Contact between stop 218 and housing end surface 224 puts the pilot valve member into the position shown by FIG. 13.

As will hereinafter be described, operation of the control mechanism to move the cylinder barrels 104, 106, 108 towards the bulkhead wall portion 32, will move all three of the drive beams 60, 62, 64 in unison, and this will in turn move all of the floor members 30, in unison, rearwardly a distance equal to the stroke length of the piston-cylinder units 66, 68, 70. When the three drive beams 60, 62, 64, and the floor members 30, reach the end of rearward travel, the control member 216 carried by drive beam 60 will contact bumper 214. This will exert a pulling force on rod 210, moving pilot 208 into the position shown by FIG. 13.

When pilot rod 208 is in the position shown by FIG. 13, pressure entering port 176 is directed by internal passageways into pressure cavity 226 and into passageway 228 which communicates with passageway 230 in the pilot rod 208. Passageway 230 communicates the pressure with a first end cavity 232 and against the outer end surface of a first piston 234. At the same time, a passageway 236 in pilot valve member 208 is positioned to communicate a second end cavity 238 with a passageway 240 that is connected to port 182 leading to return line 180. Pressure in chamber 232, unopposed by pressure in chamber 238, shifts the two poppet valve members 204, 208 into the position shown by FIG. 13. This moves a valve plug portion 242 of poppet member 204 into a seated position closing an orifice 244. Pressure in pressure cavity 226, acting on the end of poppet member 206, moves valve plug portion 246 of poppet member 206 into a seated position, closing orifice 248. At the same time, valve plug portion 250 of poppet member 204 is moved away from orifice 252 and valve plug portion 254 of poppet member 206 is moved away from orifice 256. Pressure entering housing 178 through port 176 flows through pressure cavity 226, orifice 252 and port 192 to branch conduit 190. At the same time, branch conduit 186 is connected to return fluid through port 188, orifice 256 and port 182, and into return line 180 leading back to tank 184. This position of the poppet valve members 204, 208 delivers hydraulic pressure to the working chambers 122, 124, 126. The hydraulic pressure exerts a force between the fixed piston heads 98, 100, 102 and the movable cylinder heads 110, 112, 114, wanting to move all three cylinder barrels 104, 106, 108 back to a start position. However, such movement cannot occur unless the hydraulic fluid is free to move out from working chambers 128, 130, 132. Working chamber 32 is connected via orifice 168 and tubular passageway 166 with branch conduit 186 leading directly to port 188. Accordingly, there will an immediate return movement of cylinder barrel 108 because working chamber 132 is vented back to return. However, there will be no immediate movement of cylinder barrels 104, 106. This is because working chamber 130 in cylinder barrel 106 is connected via port 192 and tubular passageway 160 to conduit 194 which extends into the valve cavity associated with sequence valve 191. The valve plug of valve 191 is closed and is further urged into a closed position by pressure in conduit 194. In similar fashion, working chamber 128 is connected via orifice 158 and passageway 154 to passageway 200. Passageway 200 is connected to the chamber 198 that is a part of sequence valve 196. The valve plug is in a closed position and is urged into the closed position by pressure within line 200. Thus, initially there is a return movement only of cylinder barrel 108, while cylinder barrels 106 and 104 remain stationary. When cylinder barrel 108 returns to a start position, its forward end contacts the operator or control rod of sequence valve 191. This moves the control member endwise and opens the orifice communicating the chamber 192 with the port leading to passageway 106. The opening of such orifice allows fluid to flow out from working chamber 130 through orifice 162, passageway 160 and passageway 194 into chamber 192 of valve 191. It then flows through the orifice into passageway 186, then through port 188, and through the valve housing 178 to the return line 180. Cylinder housing 104 remains stationary while cylinder housing 106 returns to a start position, permitted by the venting of fluid pressure from working chamber 130. When cylinder housing 106 reaches it start position, its forward end contacts the control rod or operator of sequence valve 196. The control rod movement unseats the valve plug, communicating chamber 198 with passageway 194. This allows fluid in working chamber 128 to flow via port 58, passageway 154, port 202 and passageway 200 into the chamber 198. It then flows through the valve orifice into passageway 194 and from passageway 194 into the spring chamber of sequence valve 196. It next flows from this chamber, through the valve orifice, into passageway 184 and to port 188 in valve housing 178. It then flows through the valve housing 178 to the return passageway 180 and back to tank. As this happens, cylinder barrel 104 is being driven by fluid pressure in Working chamber 122 back to its start position.

Shortly before cylinder barrel 104 reaches its start position, the control member 216 on drive beam 60 contacts bumper 212 and moves control rod 210 towards the valve housing 178. This shifts the pilot rod 208 into the position shown by FIG. 12. This position of pilot rod 208 communicates end chamber 238 with pressure port 176 via passageway 260. At the same time, the end chamber 232 is connected to return ports 182 via passages 230 and 261. The unopposed pressure in chamber 238 moves the two poppet valves 204, 206, endwise into the position shown by FIG. 12. Pressure between the two poppets 204, 206, acting on the end of poppet 204 which is in the pressure cavity 226, acts to seat valve plug 250.

When the valve plugs 204, 206 are in the position shown by FIG. 12, pressure entering pressure port 176 is communicated via pressure cavity 226 and orifice 242 to cylinder port 188. At the same time, conduit 198 is communicated with return via port 192, orifice 222 and port 182. Pressure from port 188 entering line 186 enters into conduit 166 leading to working chamber 132. The pressure holds open the valve plug of sequence valve 191 and flows through the valve orifice into the chamber 192 and out from the chamber 192 into conduit 194. From conduit 194 it flows into conduit 160 and from conduit 160 into working chamber 130. It also holds open the valve plug of sequence valve 196. Pressure flows through the valve orifice into chamber 198.

From chamber 198 the pressure flows through conduit 200 to port 202, into conduit 154, and through port 158 into working chamber 104. Thus, pressure introduction into conduit 186 results in a substantially simultaneous delivery of fluid pressure to the working chambers 128, 130, 132. At the same time, working chambers 122, 124, 126 are connected with the return conduit 180, via side ports in the piston rods 92, 94, 96, annular passageways 156, 164, 170, conduit 190 and the return passageways within valve housing 178.

The poppet valves 204, 206 provide a positive and immediate switching of the pressure and return between the conduits leading from the valve housing 178 to the working chambers on opposite sides of the piston heads. The inclusion of passages 232, 236 within the pilot valve member 208, immediately and automatically connects one of the end chambers 232, 238 to pressure, and the other chamber 232, 238 to return. The switching force is applied by the hydraulic fluid which is being introduced into the working chambers, not by a separate fluid, such as compressed air. There are no spring forces to be overcome.

The switching valve assembly which has been described, and other embodiments of the assembly, form the subject matter of my pending U.S. application Ser. No. 07/659,843, filed Feb. 22, 1991, and entitled Poppet Valve and Valve Assemblies Utilizing Same.

Referring to FIG. 6, in preferred form, the end connections of the piston rods 92, 94, 96, to the pedestal 78 and the bulkhead 24, respectively, elevates the cylinder barrels 104, 106, 108 above the top 142 of frame 76, and places them at a level above the level of floor members 30. As previously described, this creates a vertical space between the cylinder barrels 104, 106, 108 in which the transverse drive beams 60, 62, 64 are received. The drive beams 60, 62, 64 are also at a level above the level of the floor members 30. In the illustrated embodiment, there are three groups of floor members 30. Each group includes one floor member from each of the sets "1", "2" and "3". The floor members "1" are connected to drive beam 60 by drive rods 262. The floor members 30 of set "1" are connected to drive beam 62 by means of drive rods 264. The floor members of set "3" are connected to drive beam 64 by drive rods 266. The forward ends of the drive rods 262, 264, 266 are firmly secured to the drive beams 60, 62, 64, by any suitable fixed connection. For example, the forward ends of the drive rods 262, 264, 266 may be fittable into an elongated passageway in a clamp member which is secured to the drive beams 60, 62, 64. The rear ends of the drive rods 262, 264, 266 are connected to the forward ends of the floor members 30 by any suitable fixed connection. The rear ends of the drive rods 262, 264, 266 may be provided with an elongated member 268 which extends into the channel space formed in the central portion of the floor members 30 (FIG. 4). Such member 268 can be secured to the floor member 30 by means of a plurality of screw fasteners extending downwardly through the top wall of the floor member 30, and threading into insert member 268.

As best shown by FIGS. 5, 6, and 7, bulkhead portion 32 carries a plurality of bushings B, one for each drive rod 262, 264, 266. As shown by FIG. 7, each bushing B may comprise a major portion 270, in the form of a nut, having a threaded shank 272 and a head 274, and a minor portion in the form of a nut 276. An opening 278 is formed in bulkhead portion 32 for each bushing B. The shank portion 272 of the bushing B is inserted through the opening 278, and the head 274 is moved into contact with the bulkhead portion 32. Then, the nut 276 is screwed onto the threaded shank 272. Annular O-ring seals 280, 282 are preferably positioned in two annular grooves, one formed in the surface of head 274 which confronts bulkhead portion 32, and the second formed in the end surface of nut 276 which confronts the opposite surface of bulkhead portion 32. Per customary practice, the O-ring seals are compressed when the nut 276 is tightened onto the threaded shank 272. Also, seals or packings 284 are carried by the head 274 and the shank 272, to seal against leakage between the bushing B and the drive shaft 262, 264, 266. This enables the drive assembly compartment to be kept substantially dry even when a liquid laden material, such as garbage, is being carried in the material compartment 12.

The rod guiding passageways in bushings B are relatively long. The bushings B help support and stiffen the drive rods 262, 264, 266. The use of stationary piston rods 92, 94, 96, supported at both ends, and closely spaced drive beams 60, 62, 64 secured to closely spaced cylinder barrels 104, 106, 108, the placement of the drive beams 60, 62, 64 directly above the drive beams 262, 264, 266, and the use of the bushings B, result in a very small, compact and strong drive assembly. The connection of the frame 76 to the fifth wheel plate 72, and the anchoring of the piston rods 92, 94, 96 to the pedestal portion 78 of the frame 76, substantially isolates the drive forces from the floor member supporting frame structure.

In one embodiment, rear end wall 20 is formed by a water tight door or doors. The garbage or other material may be loaded into the rear end of material compartment 12, while the door or doors are open. Or, the door or doors may be closed and the material introduced into compartment 12 through an opening in the top wall. Or, the top may be omitted so that the compartment 12 is open at the top. If a water tight door or door is used, liquid in the garbage or other material can settle at the bottom of the compartment 12. The conveyor 10 is essentially leak proof and so the liquid will not leak downwardly through the bottom 22 of the trailer box TB. The bulkhead 24 and wall 28 essentially seal against leakage from material compartment 12 forwardly into the drive assembly compartment 26.

Figure 14:
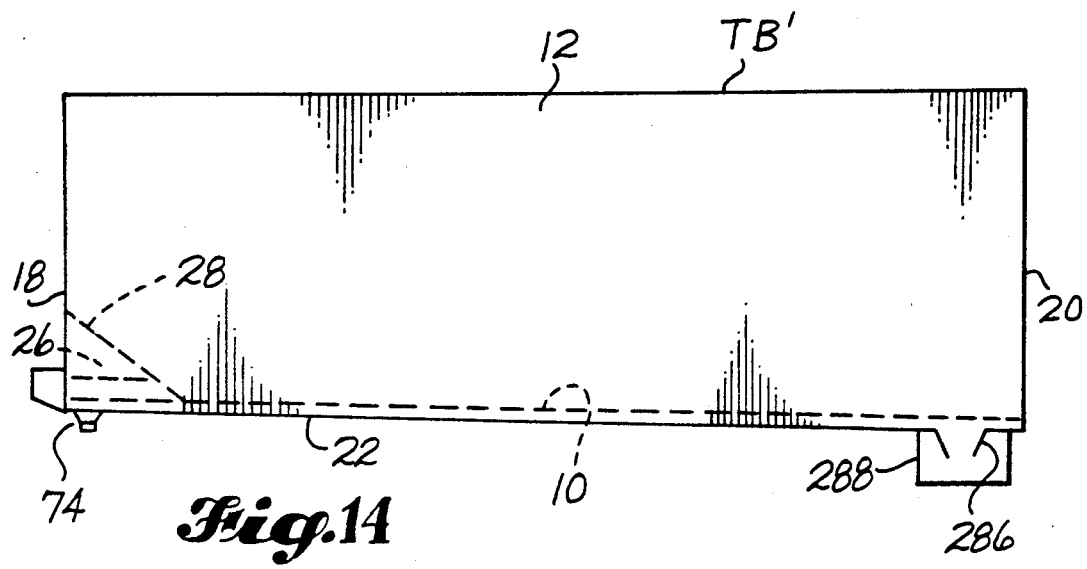
FIG. 14 is a schematic side elevational view of a trailer box or the like, for a material such as garbage, having a liquid collection trough and tank at its rear end.
Figure 15:
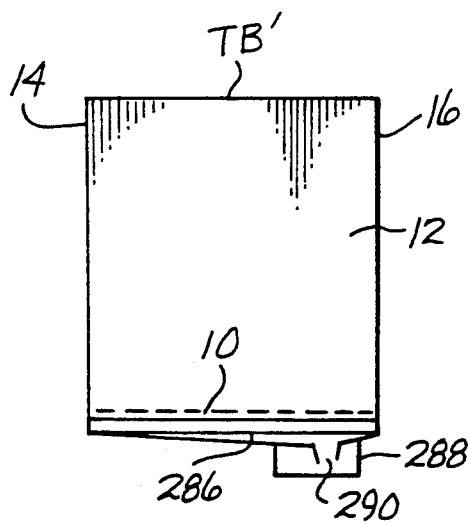
FIG. 15 is an end elevational view of the trailer box showing a liquid collection tank located at one side of the container and at the discharge end of a reciprocating floor conveyor that is in the container.
Figure 16:
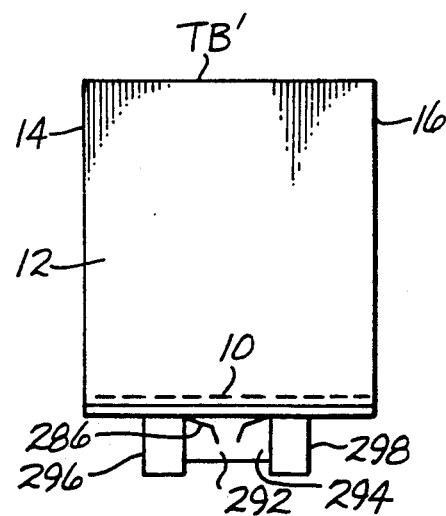
FIG. 16 is a view like FIG. 2, but showing the liquid collecting and holding tank positioned substantially at the transverse center of the trailer box.

According to another embodiment, shown by FIGS. 14–16, the trailer box TB' may include a trough 286 for collecting liquid which settles to the bottom of the compartment 12. Trough 286 may extend laterally of the trailer box TB'. It may either be sloped towards a liquid connection receptacle 290, located adjacent one side of the trailer TB'. Or, a trough 286' may be used which slopes towards a discharge opening 292 positioned to discharge the liquid into a receptacle 294 positioned between longitudinal vehicle beams 296, 298. The liquid may be collected and held in the receptacles 290, 294 until the vehicle is at the receiving site for the material. Or, liquid which during transport drains to the bottom of the material compartment 12 may be pumped up to the top of the material in the compartment 12, where it will have to settle again down through the material. The details of the liquid collection system are disclosed in my copending application Ser. No. 07/516,972, filed Apr. 30, 1990, and entitled Container For Liquid Bearing Material.

The invention is usable with all sorts of receptacles for holding materials. The receptacle may be a truck box, rather than a trailer box. Also, it may be a railroad car, a transport container, or a stationary installation. Herein, "transport container" is meant to mean a container that is filled and then picked up and transported on a truck, a flat bed rail car, or a ship. The conveyor 10 may vary substantially in construction. For example, it can be like the conveyor disclosed in my copending application Ser. No. 07/682,422, filed Apr. 8, 1991 and entitled Reciprocating Floor Conveyor and Floor Member, or the like conveyor disclosed in my copending application Ser. No. 07/682,458, filed Apr. 8, 1991, and entitled Reciprocating Conveyor Floor Members and Seals now U.S. Pat. No. 5,064,052.

The embodiments of the invention which have been illustrated and described, or merely described, are presented by way of example. The invention is not to be limited by the details of the disclosed embodiments, but is to be determined by the claims which follow, interpreted in accordance with established rules of patent claim interpretation, including use of the doctrine of equivalents.

What is claimed is:

1. A receptacle, comprising:
   a front wall, a bottom and opposite sidewalls defining an elongated, material receiving compartment;
   a reciprocating floor conveyor comprising a plurality of elongated load-supporting floor members within said material receiving compartment, supported for longitudinal back and forth movement;
   a drive assembly compartment at one end of said material receiving compartment;
   a bulkhead positioned between the material receiving compartment and the drive assembly compartment;
   a plurality of piston-cylinder drive units within the drive assembly compartment, each drive unit being associated with a separate set of said floor members, for moving the floor members longitudinally, each drive unit including longitudinally extending drive rods, one for each of its floor members, said drive rods extending from the drive units through the bulkhead into the material receiving compartment; and
   connectors in the material receiving compartment connecting the drive rods to the associated floor members;
   wherein the material receiving compartment is substantially leakproof; and
   bushings carried by the bulkhead, one for each drive rod, through which the drive rods extend, said bushings including seals for sealing against liquid leakage from the material receiving compartment into the drive assembly compartment.

2. A receptacle according to claim 1, wherein each drive unit includes a stationary piston rod having first and second ends, a piston head on the piston rod, at a location between its ends, and a cylinder barrel mounted on the piston head and piston rod for back and forth movement longitudinally of the piston head and piston rod, said cylinder barrel including a cylinder head at each of its ends having a central opening in which a portion of the piston rod is received, and each drive unit including a transverse drive beam secured to its cylinder barrel, within the drive assembly compartment, and the drive rods for each drive unit are connected to the transverse drive beam of the drive unit.

3. A receptacle, comprising:
   a front wall, a bottom and opposite sidewalls defining an elongated, material receiving compartment;
   a reciprocating floor conveyor comprising a plurality of elongated load-supporting floor members within said material receiving compartment, supported for longitudinal back and forth movement;
   a drive assembly compartment at one end of said material receiving compartment;
   a bulkhead positioned between the material receiving compartment and the drive assembly compartment;
   a plurality of piston-cylinder drive units within the drive assembly compartment, each drive unit being associated with a separate set of said floor members, for moving the floor members longitudinally, each drive unit including longitudinally extending drive rods, one for each of its floor members, said drive rods extending from the drive units through the bulkhead into the material receiving compartment; and
   connectors in the material receiving compartment connecting the drive rods to the associated floor members; and
   wherein each drive unit includes a stationary piston rod portion having first and second ends, a piston head on each piston rod, at a location between its ends, and a cylinder barrel mounted on the piston head and piston rod for back and forth movement longitudinally of the piston rod, said cylinder barrel including a cylinder head at each of its ends between a central opening in which a portion of the piston rod is received, and each drive unit including a transverse drive beam secured to its cylinder barrel, within the drive assembly compartment, and wherein the drive rod for each drive unit are connected to the transverse drive beam of the drive unit.

4. A receptacle, comprising:
   a front wall, a bottom and opposite sidewalls, defining a material receiving compartment;
   a reciprocating floor conveyor in said compartment, including a plurality of elongated floor members;
   a drive assembly compartment at the forward end of the receptacle, including piston-cylinder units for moving the floor members rearwardly, to discharge material from the material receiving compartment, and to retract the floor members forwardly;
   connectors extending between the drive units and the floor members, for connecting the drive units to the floor members, said connectors extending from the drive assembly compartment into the material receiving compartment;
   a substantially leakproof bottom in the material receiving compartment;
   a waterproof barrier separating the drive assembly compartment from the material receiving compartment, wherein the connectors are drive rods, and wherein the barrier carries a bushing for each drive rod, and each said drive rod extends through its bushing, has a forward end connected to its drive unit, and a rearward end connected to its floor member; and
   a seal associated with each bushing, for sealing against leakage between the bushing and the drive rod which extends through the bushing.

5. A receptacle according to claim 4, comprising a sloping wall within the receptacle, having a forward upper end connected to the front wall of the receptacle, a lower rear end positioned adjacent the floor members, and opposite ends connected to the sidewalls of the receptacle.

6. A receptacle, comprising:

a material receiving compartment;

a reciprocating floor conveyor comprising a plurality of elongated load-supporting floor members within said material receiving compartment, supported for longitudinal back and forth movement;

a bulkhead positioned at an end of the material receiving compartment;

a drive assembly for the floor members positioned on the side of the bulkhead opposite the floor members, said drive assembly including a plurality of piston-cylinder drive units, each drive unit being associated with a separate set of said floor members, for moving the floor members longitudinally, each drive unit including longitudinally extending drive rods, one for each of its floor members, said drive rods extending from the drive units through the bulkhead into the material receiving compartment;

connectors in the material receiving compartment connecting the drive rods to the associated floor members;

wherein the material receiving compartment includes a front wall and said bulkhead is spaced rearwardly of a lower portion of the front wall; and wherein said material receiving compartment includes a sloping divider wall which extends downwardly and rearwardly from said front wall to said floor members, and wherein said bulkhead comprises a vertical wall depending downwardly from said divider wall.

7. A receptacle according to claim 6, further comprising bushings carried by the bulkhead, one for each drive rod, through which the drive rods extend.

8. A receptacle according to claim 7, wherein said piston-cylinder units extend longitudinally of the receptacle, below said divider wall, each said piston-cylinder drive unit including a fixed portion and a movable portion, and a transverse drive beam positioned below the movable portion, said transverse drive beam being connected to the movable portion, and wherein said drive rods are connected to the drive beams.

9. A receptacle, comprising:

a bottom and walls defining an elongated, material receiving compartment; and a reciprocating floor conveyor including:

a plurality of elongated load-supporting floor members within said material receiving compartment, supported for longitudinal back and forth movement, said floor members including forward ends;

said receptacle including a bulkhead wall forwardly of the forward ends of the floor members;

a drive assembly for said conveyor positioned on the side of the bulkhead wall opposite the floor members, said drive assembly including a plurality of piston-cylinder drive units, each drive unit being associated with a separate set of said floor members, for moving its set of the floor members longitudinally;

longitudinally extending drive rods, one for each floor member, said drive rods extending through the bulkhead wall, between the drive units and the floor members;

each drive rod including a forward end connected to a related drive unit and a rearward end connected to an associated floor member;

wherein the material receiving compartment is substantially leak-proof;

wherein a liquid collecting trough extends transversely of the material receiving compartment, below the floor members, at the rear end of such compartment; and wherein the bulkhead wall includes seals for the connector rods, for sealing against leakage where the connector rods pass through the bulkhead wall.

10. A receptacle according to claim 9, further comprising a liquid collection receptacle below the conveyor, positioned to receive liquid from the liquid collection trough.

11. A receptacle according to claim 9, comprising door means at the rear end of the material receiving compartment, said door means being closable to contain material within the compartment, and openable to permit removal of the material from the compartment by operation of the conveyor.

* * * * *